(12) United States Patent
Fong et al.

(10) Patent No.: US 9,855,650 B2
(45) Date of Patent: Jan. 2, 2018

(54) HANDLE SYSTEM FOR A HANDHELD POWER TOOL

(75) Inventors: Carl-Johan Fong, Gränna (SE); Stefan Valfridsson, Jönköping (SE); Ulrik Gejervall, Forserum (SE); Matias Nybacka, Esse (FI)

(73) Assignee: HUSQVARNA AB, Huskvarna (SE)

( * ) Notice: Subject to any disclaimer, the term of this patent is extended or adjusted under 35 U.S.C. 154(b) by 239 days.

(21) Appl. No.: 13/701,634

(22) PCT Filed: Jun. 4, 2010

(86) PCT No.: PCT/SE2010/050625
§ 371 (c)(1),
(2), (4) Date: Dec. 3, 2012

(87) PCT Pub. No.: WO2011/152765
PCT Pub. Date: Dec. 8, 2011

(65) Prior Publication Data
US 2013/0097876 A1    Apr. 25, 2013

(51) Int. Cl.
*B26B 3/00* (2006.01)
*B23D 45/16* (2006.01)
(Continued)

(52) U.S. Cl.
CPC ............... *B25F 5/02* (2013.01); *A01G 3/053* (2013.01); *Y10T 29/49826* (2015.01); *Y10T 29/49876* (2015.01)

(58) Field of Classification Search
CPC ..... A01G 3/053; B25F 5/02; Y10T 29/49826; Y10T 29/49876
(Continued)

(56) References Cited

U.S. PATENT DOCUMENTS 3,423,781 A    1/1969  Henson
3,847,233 A    11/1974 Glover et al.
(Continued)

FOREIGN PATENT DOCUMENTS

CN    201044581 Y    4/2008
CN    201107933 Y    9/2008
(Continued)

OTHER PUBLICATIONS

International Search Report and Written Opinion of PCT/SE2010/050625 dated Feb. 4, 2011.
(Continued)

*Primary Examiner* — Ghassem Alie
*Assistant Examiner* — Bharat C Patel
(74) *Attorney, Agent, or Firm* — McNair Law Firm, P.A.

(57) ABSTRACT

The present invention relates to a method and devices for mounting and securing a handle (110) on a power driven hand tool (100) The power driven hand tool (100) is provided with a main body (104) comprising a housing (106) with a drive unit for driving a working member of the tool (100), a handle (110) for user operation of the tool (100), and a connecting part (112) for connecting the handle (110) with the main body (106). Further, a front end of the handle (110) may be inserted into a rear end of the connecting part (112) in a first rotational position in relation to the connecting part (112), and the handle (110) may be rotated into a second rotational position in relation to the connecting part (112). In the second rotational position, the handle (110) and the connecting part (112) are locked to each other by means of an automatic locking mechanism.

18 Claims, 8 Drawing Sheets

(51) Int. Cl.

| | |
|---|---|
| *B23D 51/01* | (2006.01) |
| *A47B 95/02* | (2006.01) |
| *B65D 25/28* | (2006.01) |
| *B25G 1/04* | (2006.01) |
| *B25F 5/02* | (2006.01) |
| *A01G 3/053* | (2006.01) |

(58) Field of Classification Search
USPC ...... 30/388, 392, 166.3, 514, 517–519, 208, 30/277.4, 340; 16/110.1, 111.1, 430, 429, 16/900; 451/344, 350–359
See application file for complete search history.

(56) References Cited

U.S. PATENT DOCUMENTS

| | | | | |
|---|---|---|---|---|
| 4,207,675 | A * | 6/1980 | Causey et al. | 30/296.1 |
| 5,010,615 | A * | 4/1991 | Carter | 15/104.94 |
| 5,065,476 | A * | 11/1991 | Dohse | B24B 23/00 |
| | | | | 16/422 |
| 5,112,156 | A * | 5/1992 | Boyer | 403/287 |
| 5,669,101 | A | 9/1997 | Aiyama et al. | |
| 5,778,649 | A | 7/1998 | Losdahl et al. | |
| 5,875,510 | A * | 3/1999 | Lamond et al. | 15/167.1 |
| 6,108,867 | A * | 8/2000 | Nagashima | 16/110.1 |
| 6,266,850 | B1 * | 7/2001 | Williams et al. | 16/430 |
| 6,293,859 | B1 * | 9/2001 | Fink et al. | 451/344 |
| 6,349,443 | B1 * | 2/2002 | Randolph et al. | 15/114 |
| 6,425,776 | B1 * | 7/2002 | Fredl | 439/320 |
| 6,443,675 | B1 * | 9/2002 | Kopras et al. | 409/182 |
| 6,644,969 | B2 * | 11/2003 | Kumar | 433/173 |
| 6,701,622 | B2 | 3/2004 | Covell et al. | |
| 6,769,338 | B2 * | 8/2004 | Svetlik et al. | 83/471.3 |
| 6,889,917 | B2 * | 5/2005 | Fahy et al. | 239/525 |
| 6,912,790 | B2 * | 7/2005 | James et al. | 30/392 |
| 6,973,726 | B2 * | 12/2005 | Kramer | 30/216 |
| 7,101,274 | B1 * | 9/2006 | Etter et al. | 451/344 |
| 7,266,893 | B1 * | 9/2007 | Ellson et al. | 30/276 |
| 7,275,322 | B2 * | 10/2007 | Stones | 30/216 |
| 7,287,331 | B2 * | 10/2007 | Sasaki et al. | 30/519 |
| 7,401,660 | B2 * | 7/2008 | Stones | 173/170 |
| 7,407,018 | B2 * | 8/2008 | Sasaki | A01G 3/053 |
| | | | | 173/170 |
| 7,549,196 | B2 * | 6/2009 | Ziegs et al. | 16/430 |
| 7,597,155 | B2 * | 10/2009 | Ullrich et al. | 173/29 |
| 7,836,546 | B2 * | 11/2010 | Yoo et al. | 15/352 |
| 7,866,048 | B2 * | 1/2011 | Kodama et al. | 30/216 |
| 7,877,842 | B2 * | 2/2011 | Bagley | A46B 5/02 |
| | | | | 16/422 |
| 7,958,642 | B2 * | 6/2011 | Rosskamp | A01G 3/053 |
| | | | | 30/228 |
| 8,034,026 | B2 * | 10/2011 | Grant | A61M 5/14244 |
| | | | | 604/120 |
| 8,065,774 | B2 * | 11/2011 | Schiesz | A46B 5/0083 |
| | | | | 15/143.1 |
| 8,136,254 | B2 * | 3/2012 | Gieske et al. | 30/277.4 |
| 8,156,656 | B2 * | 4/2012 | Tate | A01G 3/053 |
| | | | | 16/110.1 |
| 8,163,414 | B2 * | 4/2012 | Wan | B25F 5/02 |
| | | | | 292/64 |
| 8,336,213 | B2 * | 12/2012 | Stones | 30/216 |
| 8,393,835 | B2 * | 3/2013 | Wasielewski | 409/182 |
| 8,752,644 | B2 * | 6/2014 | Weusthof | 173/170 |
| 8,813,733 | B2 * | 8/2014 | Tamura | A01G 3/047 |
| | | | | 123/334 |
| 2003/0037933 | A1 * | 2/2003 | Breneman et al. | 172/14 |
| 2004/0128837 | A1 | 7/2004 | Kramer | |
| 2004/0148789 | A1 * | 8/2004 | Gist et al. | 30/392 |
| 2005/0115079 | A1 | 6/2005 | Sasaki et al. | |
| 2006/0112804 | A1 * | 6/2006 | Dils et al. | 83/581 |
| 2008/0184568 | A1 | 8/2008 | Gieske et al. | |
| 2009/0099523 | A1 * | 4/2009 | Grant | A61M 5/14244 |
| | | | | 604/151 |
| 2010/0064481 | A1 * | 3/2010 | Martin | 16/426 |
| 2010/0077898 | A1 * | 4/2010 | Smith | B23D 47/00 |
| | | | | 83/469 |
| 2011/0247224 | A1 * | 10/2011 | Hernandez | 30/394 |

FOREIGN PATENT DOCUMENTS

| | | |
|---|---|---|
| GB | 2417182 A | 2/2006 |
| JP | 04033505 A | 4/1992 |
| JP | 2005160306 A | 6/2005 |
| JP | 2009273434 | 11/2009 |
| SE | 532753 C2 | 3/2010 |

OTHER PUBLICATIONS

Chapter I International Preliminary Report on Patentability of PCT/SE2010/050625 dated Dec. 4, 2012.

* cited by examiner

HANDLE SYSTEM FOR A HANDHELD POWER TOOL

TECHNICAL FIELD

The present invention relates to a power driven hand tool comprising a detachable handle and to such a handle itself. It also relates to a method for mounting and securing a handle to a power driven hand tool.

BACKGROUND

Power driven hand tools, such as, but not limited to, hedge trimmers, sometimes are provided with a handle, which is detachable from a main body of the tool. Further, this handle may also be rotatable with respect to the tool for providing ergonomic working positions in various working environments.

The current systems for mounting a detachable handle on the power tool usually include some fastening components, such as screws or clips. These small components may easily get lost. Also, the assembly procedure may get time consuming if several fastening components need to be installed during the assembly. Further, fastening components such as screws require the use of a screwdriver or the like. Another problem with such systems is that, as these systems are used with power tools such as hedge trimmers that generate a lot of vibrations, the fastening components may loosen over a period of operating time, and ultimately the fastening components may detach from the tool.

There is a need for an improved system for mounting a detachable handle on a handheld power tool, which will overcome the disadvantages of the existing systems.

SUMMARY

In view of the above, it is an objective to provide an efficient system for mounting a detachable handle on a power driven hand tool. In particular, an objective is to provide devices and methods for simple and safe mounting of a detachable handle on a power driven hand tool without using external fastening components.

In accordance with an embodiment of the present invention, there is provided a power driven hand tool comprising a main body comprising a housing with a drive unit for driving a working member of the tool, a handle for user operation of the tool, and a connecting part for connecting the handle with the main body. Further, a front end of the handle is insertable into a rear end of the connecting part in a first rotational position in relation to the connecting part, and the handle is rotatable into a second rotational position in relation to the connecting part. In the second rotational position the handle is lockable to the connecting part by means of an automatic locking mechanism.

Since the locking mechanism is automatic, no external fastening means are required. Thereby, the handle can be mounted on the power driven hand tool in a simple and time efficient way.

According to an example embodiment, the first rotational position of the handle relative to the connecting part is a non-operating position. An advantage with this is that a user would not think of operating the tool when the handle is still in its insertion position and thus not locked to the connecting part. Thereby a safe mounting of the handle on the tool is achieved.

According to an example embodiment, the second position of the handle relative to the connecting part is located at one end of a predefined continuous angular range of positions, which comprises one or more operating positions. Thereby, the handle is always locked to the tool before it reaches an operating position.

According to an example embodiment, the one or more operating positions include a central position and the first rotational position is substantially an upside-down position of the handle in relation to the central position and to the connecting part. With this design, it is clear to the user that the insertion position is not a position intended for working with the tool.

According to an example embodiment, the front end of the handle has a substantially tubular shape and is provided with a protrusion extending outwards in a substantially radial direction. Further, the connecting part is provided with a corresponding recess. Also, the recess and the protrusion are arranged in such a way that the protrusion can slide in the recess at insertion of the handle into the connecting part. This makes insertion of the handle into the connecting part simple.

According to an example embodiment, the protrusion and the recess are adapted to restrict the position of the handle to a non-operating position in relation to the connecting part, when it is inserted into the connecting part. This way the user will not be mislead to operating the power driven hand tool when the handle is in its insertion position and not locked to the connecting part.

According to an example embodiment, the recess of the connecting part extends in a substantially axial direction of the connecting part. An advantage with this arrangement is that the handle is easily inserted as it is kept in the same rotational position until it is fully inserted into the connecting part.

According to an example embodiment, the automatic locking mechanism is a snap locking mechanism. The handle can be locked to the connecting part in the second rotational position by means of the snap locking mechanism. Thus, a simple mounting and securing of the handle to the tool is provided. An advantage of such a mechanism is that it does not need any external fastening components.

According to an example embodiment, the snap locking mechanism is arranged in such a way that the handle can be rotated in the connecting part until the protrusion passes the snap locking mechanism. Further, on passing the snap locking mechanism the handle will reach a predefined continuous angular range of positions which includes one or more possible operating positions. As the handle reaches the range of positions including the operating positions upon passing the snap locking mechanism, it is clearly indicated to the user when the handle has reached this range.

According to an example embodiment, the snap locking mechanism is provided approximately 90.degree. from the central operating position. Since many tools with a rotatable handle have two operating positions of the handle located 90.degree. off the central position (one on each side of the central position), a snap locking mechanism located about 90.degree. from the central position will be close to one of the lateral operating positions.

According to an example embodiment, the power driven hand tool is a hedge trimmer.

An example embodiment describes a handle for operation of a power driven hand tool. The power driven hand tool includes a connecting part for connecting the handle to the power driven hand tool. Here, a front end of the handle is adapted to be inserted into the connecting part in a first rotational position in relation to the connecting part and to be rotated into a second rotational position, in which the handle is lockable to the connecting part by means of an automatic locking mechanism and without the use of any external fastening components.

Since the locking mechanism is automatic, no external fastening means are required. Thereby, the handle can be mounted on the power driven hand tool in a simple and time efficient way.

According to an example embodiment, the first rotational position of the handle relative to the connecting part is a non-operating position. Since the insertion position is not an operating position, the user is not likely to operate the tool when the handle is still in its insertion position and thus not locked to the connecting part. Thereby, a safe mounting of the handle on the tool is achieved.

According to an example embodiment, the second rotational position of the handle relative to the connecting part is located at one end of a predefined continuous angular range of positions, which comprises one or more operating positions. Thereby, the handle is always locked to the tool before it reaches an operating position.

According to an example embodiment, the one or more operating positions include a central position and the first rotational position is substantially an upside-down position of the handle in relation to the central position and to the connecting part. With this design, it is clear to the user that the insertion position is not a position intended for working with the tool.

According to an example embodiment, the front end of the handle has a substantially tubular shape and is provided with a protrusion extending outwards in a substantially radial direction. Further, the protrusion is configured to slide in a corresponding recess provided in the connecting part at insertion of the handle into the connecting part. This makes insertion of the handle into the connecting part simple.

According to an example embodiment, after insertion of the handle into the connecting part, the handle can be rotated such that the protrusion passes an automatic snap locking mechanism arranged in the connecting part. Further, when the protrusion reaches the snap locking mechanism, the handle reaches a predefined continuous angular range of positions, which comprises one or more operating positions. As the handle reaches the range of positions including the operating positions upon passing the snap locking mechanism, it is clearly indicated to the user when the handle has reached this range.

An example embodiment describes a method for assembling a handle and a connecting part of a power driven hand tool. The method includes a step of inserting a front end of the handle into a rear end of the connecting part in a first rotational position in relation to the connecting part. The method further includes a step of rotating the handle into a second rotational position in relation to the connecting part. In the second rotational position, the handle is lockable to the connecting part by means of an automatic locking mechanism.

Since the locking mechanism is automatic, no external fastening means are required. Thereby, the handle can be mounted on the power driven hand tool in a simple and time efficient way.

According to an example embodiment, the first rotational position of the handle relative to the connecting part is a non-operating position. Since the insertion position is not an operating position, the user is not likely to operate the tool when the handle is still in its insertion position and thus not locked to the connecting part. Thereby, a safe mounting of the handle on the tool is achieved.

According to an example embodiment, the second position of the handle relative to the connecting part is located at one end of a predefined continuous angular range of positions, which comprises one or more operating positions. Thereby, the handle is always locked to the tool before it reaches an operating position.

According to an example embodiment, the one or more operating positions include a central position and the first rotational position is substantially an upside-down position of the handle in relation to the central position and to the connecting part. With this design, it is clear to the user that the insertion position is not a position intended for working with the tool.

According to an example embodiment, the front end of the handle has a substantially tubular shape and is provided with a protrusion extending outwards in a substantially radial direction. Further, the connecting part is provided with a corresponding recess. Also, the recess and the protrusion are arranged in such a way that the protrusion can slide in the recess at insertion of the handle into the connecting part. This makes insertion of the handle into the connecting part simple.

According to an example embodiment, the protrusion and the recess are adapted to restrict the position of the handle at insertion into the connecting part to a non-operating position in relation to the connecting part. This way the user will not be mislead to operating the power driven hand tool when the handle is in its insertion position and not locked to the connecting part.

According to an example embodiment, the automatic locking mechanism is a snap locking mechanism. An advantage of such mechanism is that it is simple and inexpensive to manufacture.

According to an example embodiment, the snap locking mechanism is arranged in such a way that the handle after insertion into the connecting part can be rotated in the connecting part such that the protrusion passes the snap locking mechanism. Further, on passing the snap locking mechanism the handle reaches the predefined continuous angular positions, which comprises one or more operating positions. As the handle reaches the range of positions including the operating positions upon passing the snap locking mechanism, it is clearly indicated to the user when the handle has reached this range.

BRIEF DESCRIPTION OF THE DRAWINGS

The invention will in the following be described in more detail with reference to the enclosed drawings, wherein.

DESCRIPTION OF EMBODIMENTS

Figure 1:
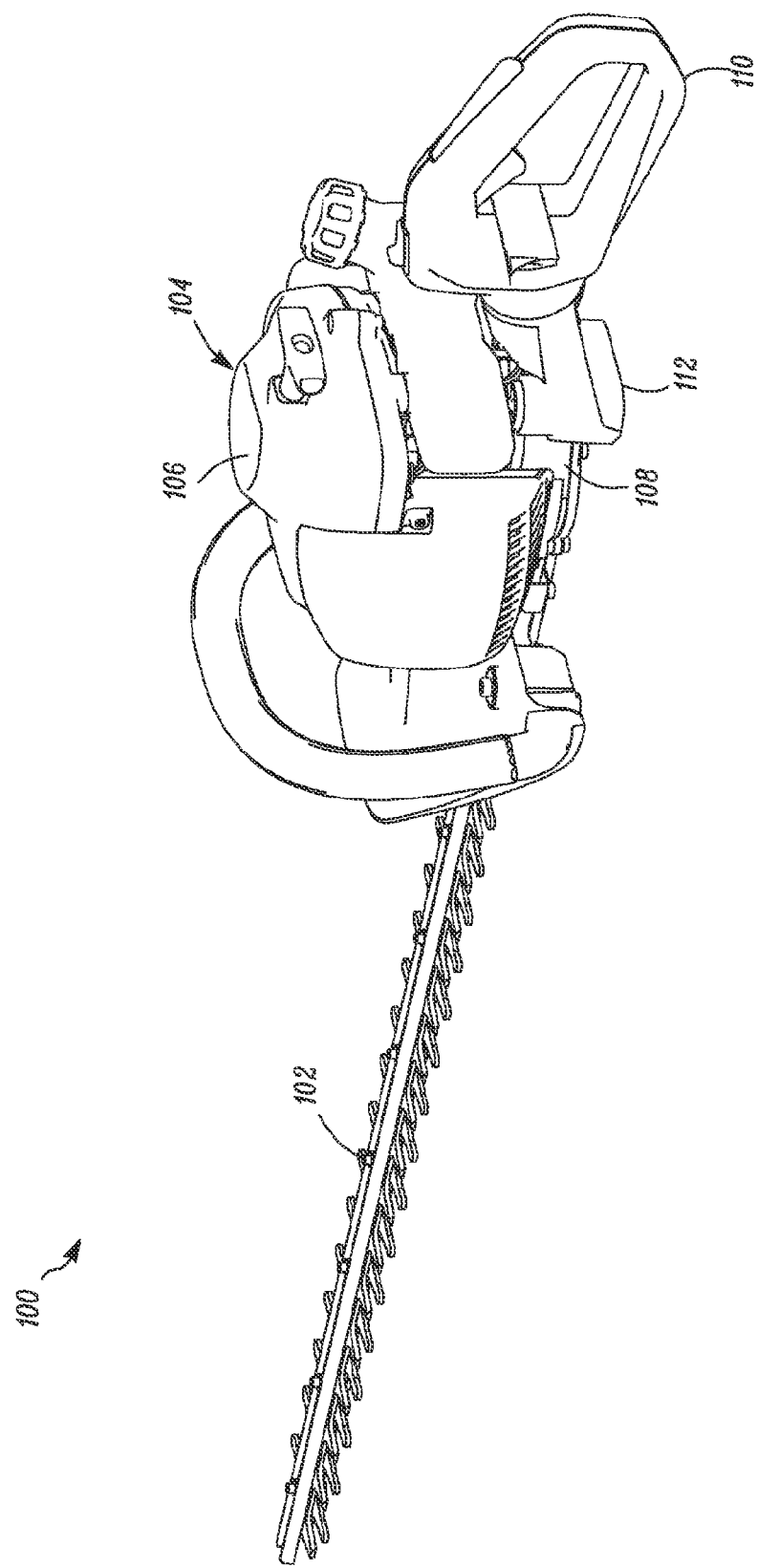
FIG. 1 illustrates a perspective view of a power driven hand tool, according to an embodiment of the present invention.

The present invention will be described more fully hereinafter with reference to the accompanying drawings, in which example embodiments of the invention incorporating one or more aspects of the present invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. For example, one or more aspects of the present invention can be utilized in other embodiments and even other types of devices. In the drawings, like numbers refer to like elements.

FIG. 1 illustrates a perspective view of a power driven hand tool 100, according to an embodiment of the present invention. In the exemplary embodiment shown in HG. 1, the power driven hand tool 100 is a hedge trimmer. However, the present invention may also be used in other equipments such as, but not limited to, shears, chainsaws or other cutting or pruning tools that are provided with a detachable handle, without departing from the essence of the present invention.

Further, the power driven hand tool 100 may include a working member 102. The working member 102 may be a blade, a saw chain or the like. In the embodiment illustrated in FIG. 1, the working member 102 is a cutting blade. The power driven hand tool 100 may also include a main body 104, which in turn may include a housing 106 and a base portion 108. The housing 106 may further include a drive unit (not shown), such as an engine or an electric motor. The drive unit may drive the working member 102 of the power driven hand tool 100.

The power driven hand tool 100 may further include a handle 110. The handle 110 may be of any shape that provides ergonomic handling of the power driven hand tool 100. Further, the handle 110 may include various controls mounted on it for controlling the working of the power driven hand tool 100. The controls may include a throttle control, a mode control, en on/off control and the like. The handle 110 may be rotatable with respect to the power driven hand tool 100 for adapting to different working environments. Further, the handle 110 may be detachable from the power driven hand tool 100.

Figure 2:
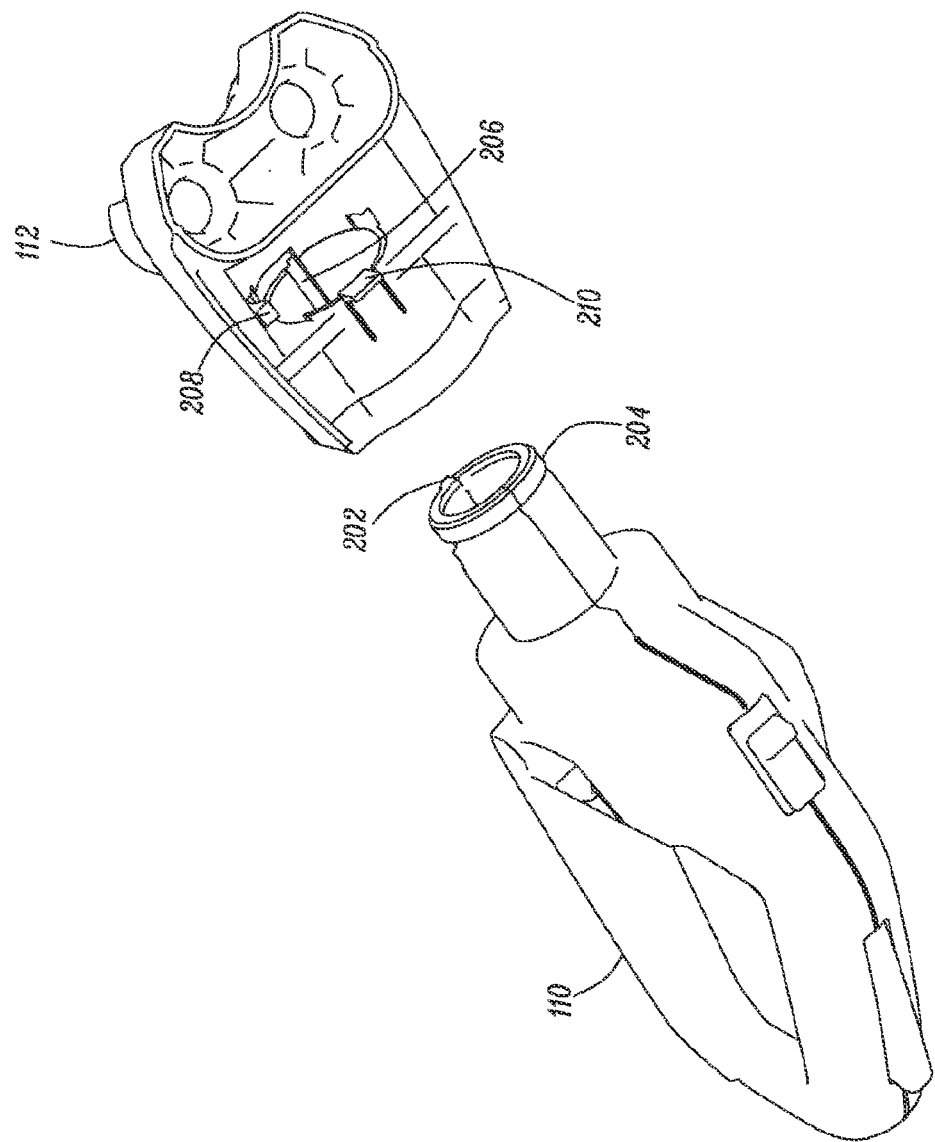
FIG. 2 illustrates a perspective view of a handle and a connecting part as seen from one angle before they are joined together, according to an embodiment of the present invention.

In an embodiment of the present invention, a connecting part 112 may be provided for connecting the handle 110 with the main body 104. The connecting part 112 may be a separate part fixedly mounted on the main body 104 or an integral part of the main body 104. Further, as illustrated in FIG. 2, the connecting part 112 may have a locking mechanism 208 for securing the handle 110 with the connecting part 112 and the main body 104. It may also include a related means for functionally connecting the controls provided on the handle 110 with the power driven hand tool 100.

Further, the handle 110 may have a central position in relation to the power driven hand tool 100 and to the connecting part 112. In FIG. 1, the handle 110 of the power driven hand tool 100 is positioned in its central position. Here, the central position is a position of the handle 110 suited for cutting in a substantially horizontal plane.

FIG. 2 illustrates a perspective view of the handle 110 and the connecting part 112 as seen from an angle before they are joined together, according to an embodiment of the present invention. The handle 110 is positioned in an insertion position in relation to the connecting part, referred to as a first rotational position, which in this embodiment is an up-side-down position in relation to the connecting part 112. A front end of the handle 110 may have a tubular shape, and a protrusion 202 extending outwards in a substantially radial direction. Also, the handle 110 may have a protruding ring 204. Further, the connecting part 112 may have a tubular shape at an inner side of its rear end, where it is connected to the handle 110, and a recess 206 corresponding to the protrusion 202 on the handle 110. The recess 206 may extend in a substantially axial direction of the tubularly shaped part of the connecting part 112. The recess 206 and the protrusion 202 may be arranged in such a way that the protrusion 202 can slide in the recess 206 at insertion of the handle 110 into the connecting part 112.

In alternative embodiments (not shown), the handle 110 and the connecting part 112 may have a plurality of protrusions and a plurality of corresponding recesses respectively. In an embodiment, there may be only one protrusion on the handle 110, but either several recesses or one single recess which is wider than the width of the protrusion 202, so that several positions of the handle 110 are possible for insertion into the connecting part 112. Also, in an embodiment, the recess or recesses may extend in a direction which is not the axial direction of the tubularly shaped part of the connecting part 112. For example, the recess may extend obliquely, so that the handle 110 is rotated during the insertion into the connecting part 112.

The locking mechanism provided for securing the handle 110 to the connecting part 112 is an automatic locking mechanism and may be a snap locking mechanism 208. In a preferred embodiment, illustrated in FIGS. 2, 4 and 5, the snap locking mechanism 208 is located approximately 90° from the central position. In an alternative embodiment, there may be two snap locking mechanisms 208 of this type, each of them located approximately 90° off the central position on either side of the central position.

To achieve a stable connection between the handle 110 and the connecting part 112, the connecting part 112 may be provided with one or more snap locking mechanisms of a second type, here referred to as snap fasteners 210. In an embodiment, as illustrated in FIG. 2, the connecting part has one snap fastener 210 which is located 180° from the recess 206. Further, the snap fastener 210 may indicate that the handle 110 has been inserted far enough into the connecting part to be rotated inside the connecting part.

Figure 3:
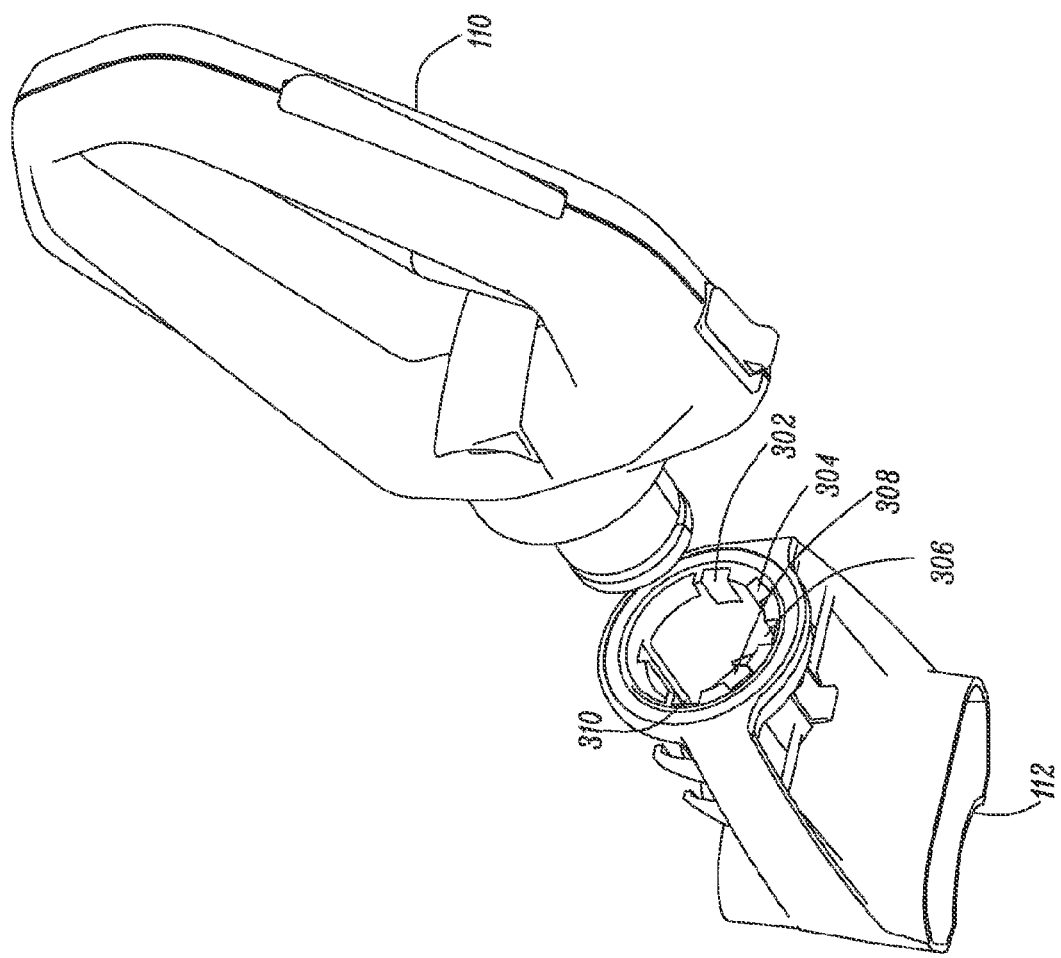
FIG. 3 illustrates a perspective view of the handle and the connecting part as seen from another angle before they are joined together, according to an embodiment of the present invention.

FIG. 3 illustrates another perspective view of the handle 110 and the connecting part 112 as seen from an angle before they are joined together. The power driven hand tool 100 may have to be used in a variety of different operating areas and held at a plurality of different angles. Hence, the handle 110 of the power driven hand tool 100 may have to be adapted to be rotated. This figure illustrates different rotational positions 302, 304, 306, 308 and 310 of the handle 110 in relation to the connecting part 112, in which the power driven hand tool 100 can be operated. For the locking in a selected rotational position a latch device is normally provided. The latch device is not shown in the figures and will not be further described.

Figure 4:
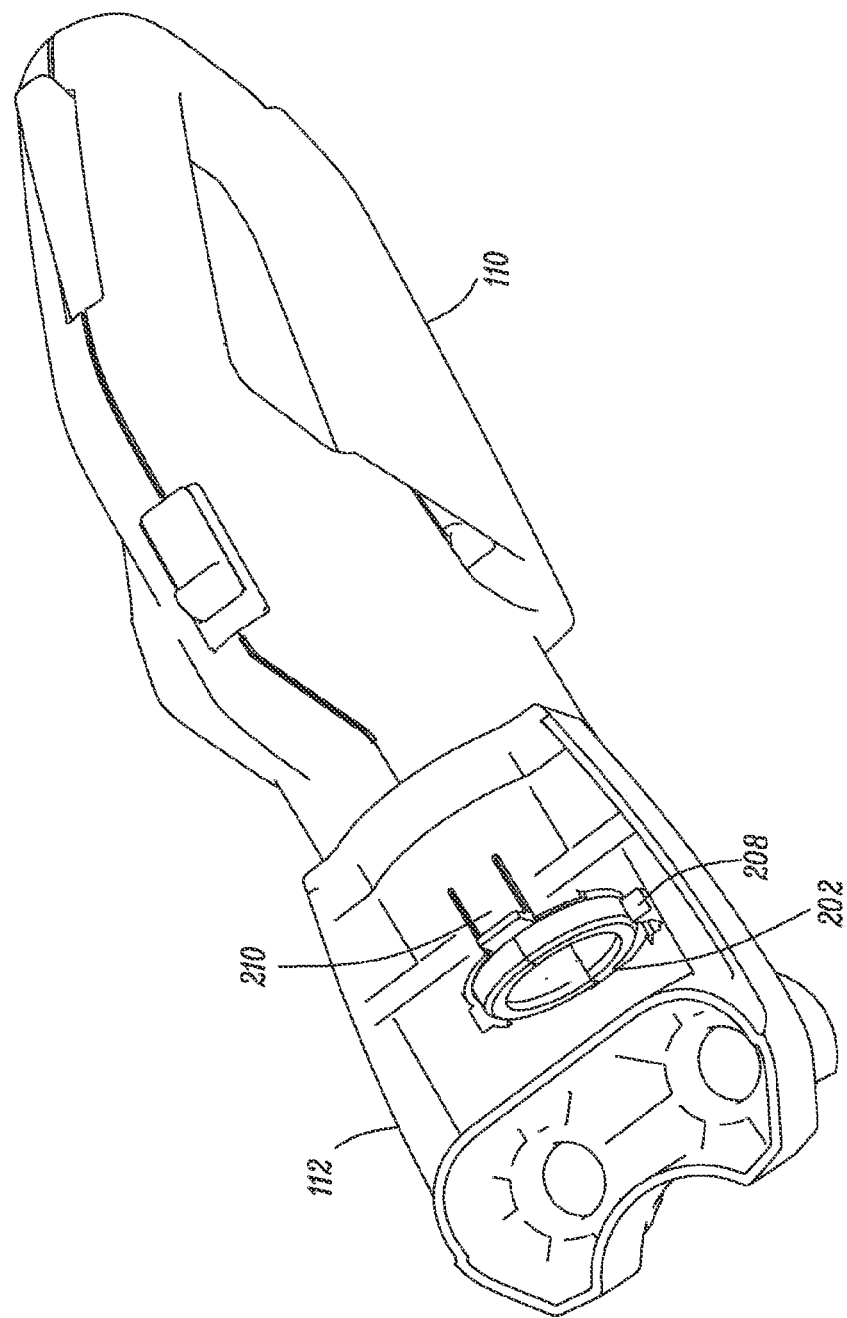
FIG. 4 illustrates a perspective view of the handle in a first position, after insertion into the connecting part, according to an embodiment of the present invention.

FIG. 4 illustrates a perspective view of the handle 110 and the connecting part 112 where the connecting part is seen mainly from the bottom side of it to clearly illustrate the locking mechanism 208. The handle 110 is positioned in a first rotational position in relation to the connecting part 112 (and to the power driven hand tool 100) after insertion into the connecting part 112.

The first rotational position is a position, in which the protrusion 202 can enter the recess 206 and the tubular part of the handle 110 can be inserted into the connecting part 112. In a preferred embodiment of the present invention, the first rotational position is a non-operating position, i.e. a position which is not intended for operation of the power driven hand tool 100. The protrusion 202 and the recess 206 are adapted to restrict the rotational position of the handle 110 at insertion into the connecting part 112 to a non-operating position. In an embodiment of the present invention, the first, non-operational, rotational position may be substantially an upside-down position of the handle 110 with respect to the central position and to the connecting part 112. In this position the handle 110 does not provide an ergonomic grip for operating the power driven hand tool 100 and the user is not likely to start operating the power driven hand tool 100 in this position.

In an alternative embodiment of the present invention, the first, non-operating, rotational position may be one of a plurality of non-operating positions in which the handle 110 can be inserted into the connecting part 112. This may be achieved (as described above) by either providing several recesses 206 on the connecting part 112 or providing one recess 206 which is wide enough to provide a range of different non-operating positions.

Figure 5:
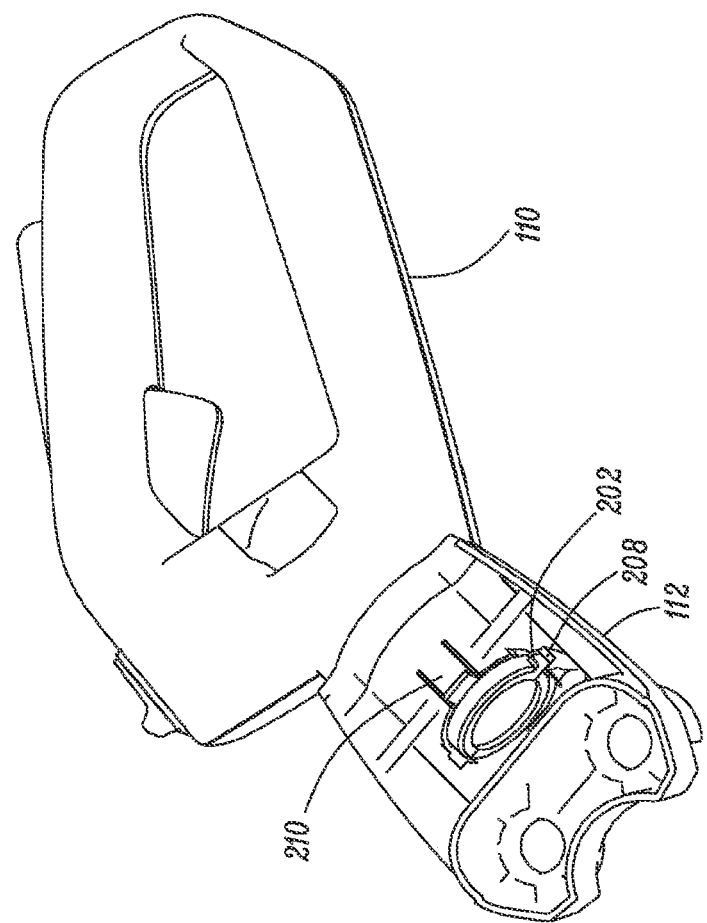
FIG. 5 illustrates a perspective view of the handle in a second position, according to an embodiment of the present invention.

FIG. 5 illustrates a perspective view of the handle 110 in a second position in relation to the connecting part 112 (and to the power driven hand tool 100) after it has been inserted into and rotated in the connecting part 112, according to an embodiment of the present invention. The second rotational position is the position, in which the handle 110 can be locked to the connecting part 112 by means of the automatic snap locking mechanism 208. In a preferred embodiment, the second rotational position is located at the end of a predefined range of positions of the handle including one or more operating positions, i.e. positions which are intended for operation of the power driven hand tool 100. The handle 110 reaches this predefined range of positions when the handle 110 has been rotated from the initial non-operating position to a position where the protrusion 202 has passed the snap locking mechanism 208. In the embodiment of FIG. 5, the second rotational position is located approximately 90° from the initial non-operating position.

In the illustrated embodiment, where there are two lateral operating positions located approximately 90° from the central position, the second position may be very close to or essentially the same as one of the lateral positions In one embodiment, the plurality of operating positions correspond to the rotational positions 302, 304, 306, 308 and 310 illustrated in FIG. 3. In an alternative embodiment, the handle 110, on reaching the snap locking mechanism 208, may have to further traverse a predetermined rotational distance to reach the predefined continuous angular range of positions.

Figure 6:
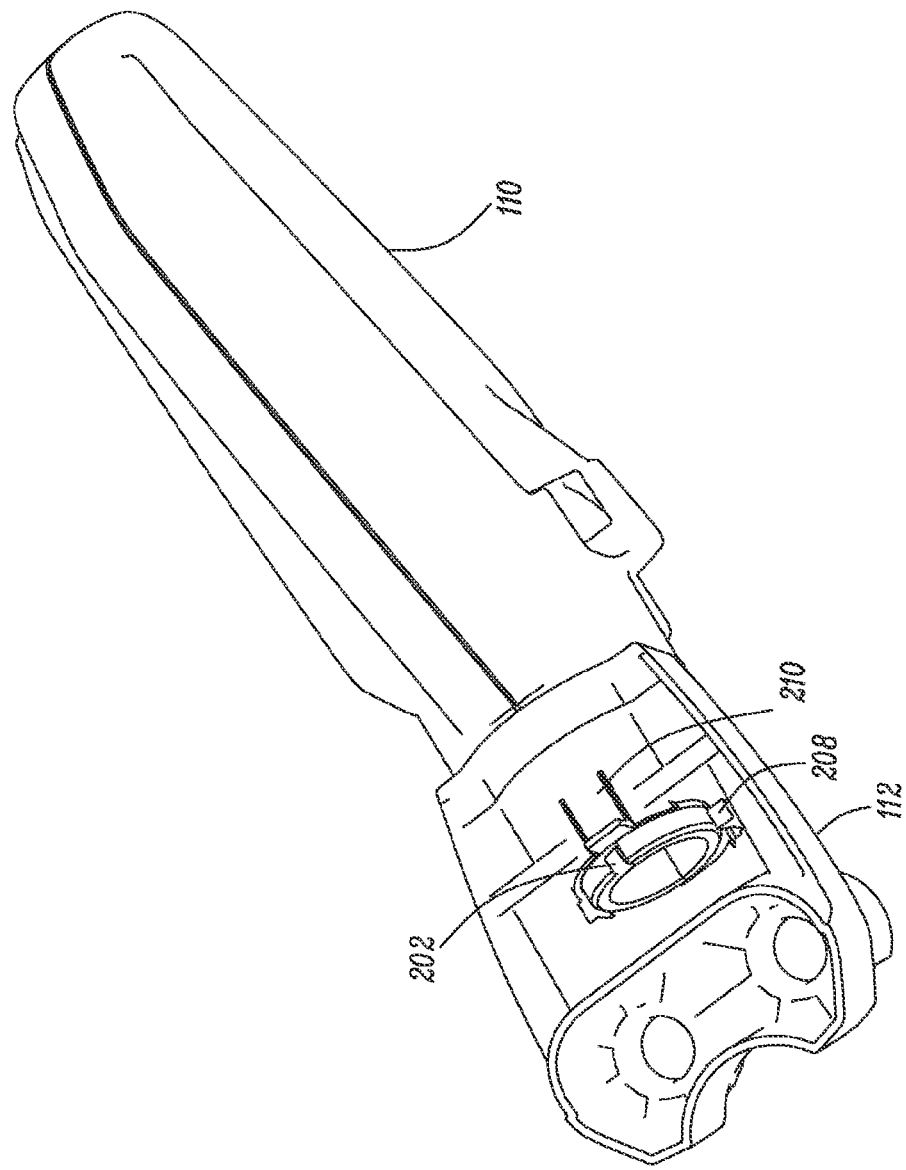
FIG. 6 illustrates a perspective view of the handle in a central position, according to an embodiment of the present invention.

FIG. 6 illustrates a perspective view of the handle 110 in the central position in relation to the connecting part 112 (and to the power driven hand tool 100) after it has been inserted into the connecting part 112 and rotated approximately 180°. In an embodiment, this central position is one of the plurality of operating positions located within the predefined continuous angular range of positions. Further, at least one operating position may be present on either side of the central position, located approximately 90° from the central position, and adapted for performing the operation of the power driven hand tool 100 in a substantially vertical plane. The central position is adapted for performing the operation of the power driven hand tool 100 in a substantially horizontal plane.

The different arrangements of various possible operating and non-operating positions will be further explained in conjunction with FIG.

For removing the handle 110 from the connecting part 112 a tool, such as a screw driver or the like, may be needed. By means of the tool the snap locking mechanism 208 may be adjusted for enabling the protrusion 202 to be rotated back past the snap locking mechanism 208. Similarly, the tool may be used for adjusting the snap fastener 210 for enabling the protruding ring 204 to be slipped past the snap fastener 210 and out of the connecting part.

This type of assembly eliminates the need for external fastening components such as, screws, and also enables the operation of the power driven hand tool 100 only when the handle 110 is properly secured on the power driven hand tool 100.

Figure 7:
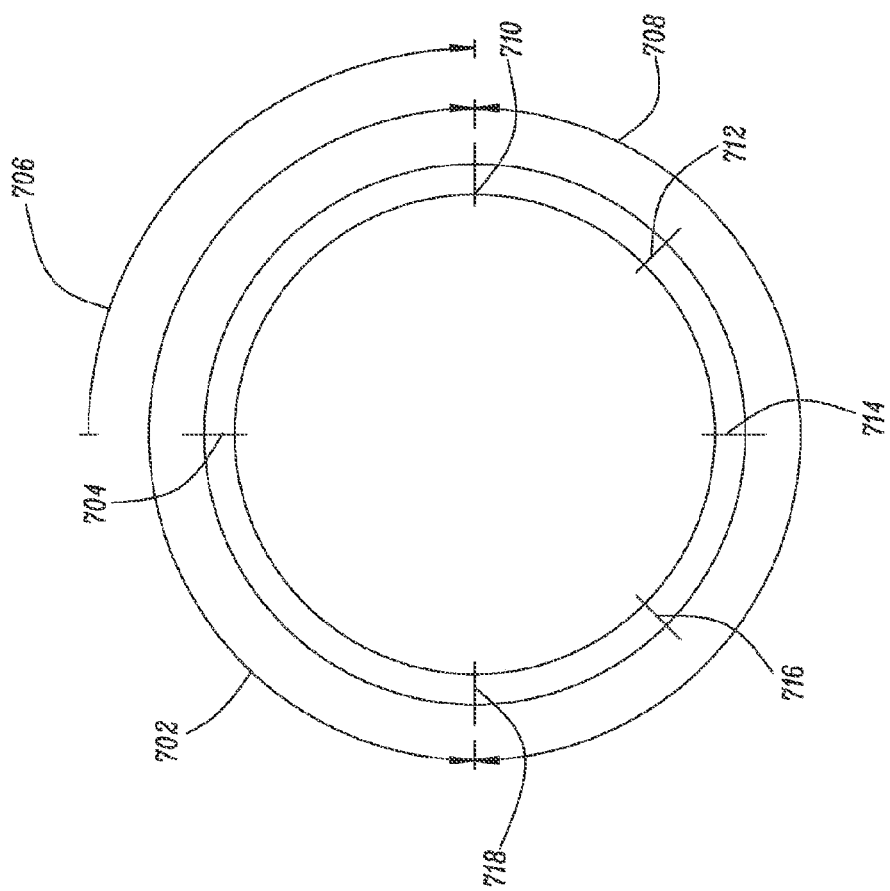
FIG. 7 is a schematic view illustrating various non-operating and operating positions for the handle mounted on the power driven hand tool, according to an embodiment of the present invention.

FIG. 7 is a scheme for illustrating various non-operating and operating positions of the handle 110 in relation to the connecting part 112 (and to the power driven hand tool 100), according to an embodiment of the present invention. The power driven hand tool 100 may have a continuous range of non-operating positions 702, in which one non-operating position 704 is a preferred position for insertion of the handle 110 into the connecting part 112. The range of non-operating positions 702 may have an angular size of approximately 180°.

In the illustrated embodiment, the non-operating position 704, i.e. the first rotational position of the handle in relation to the connecting part 112, is substantially an upside-down position in relation to the central position 714.

In an embodiment of the present invention, there may be a predefined continuous angular range of positions 708 including one or more operating positions, which can be reached by rotating the handle 110 inside the connecting part 112 from the first rotational position and such that the protrusion 202 passes the snap locking mechanism 208. In a preferred embodiment, the handle needs to be rotated approximately 90° from the first rotational position for the protrusion 202 to pass the snap locking mechanism 208. The continuous angular range of positions 708 includes a plurality of operating positions 710, 712, 714, 716 and 718 that correspond to rotational positions 302, 304, 306, 308 and 310. In an embodiment of the present invention, the predefined continuous angular range of positions 708 has an angular size of approximately 180°.

Figure 8:
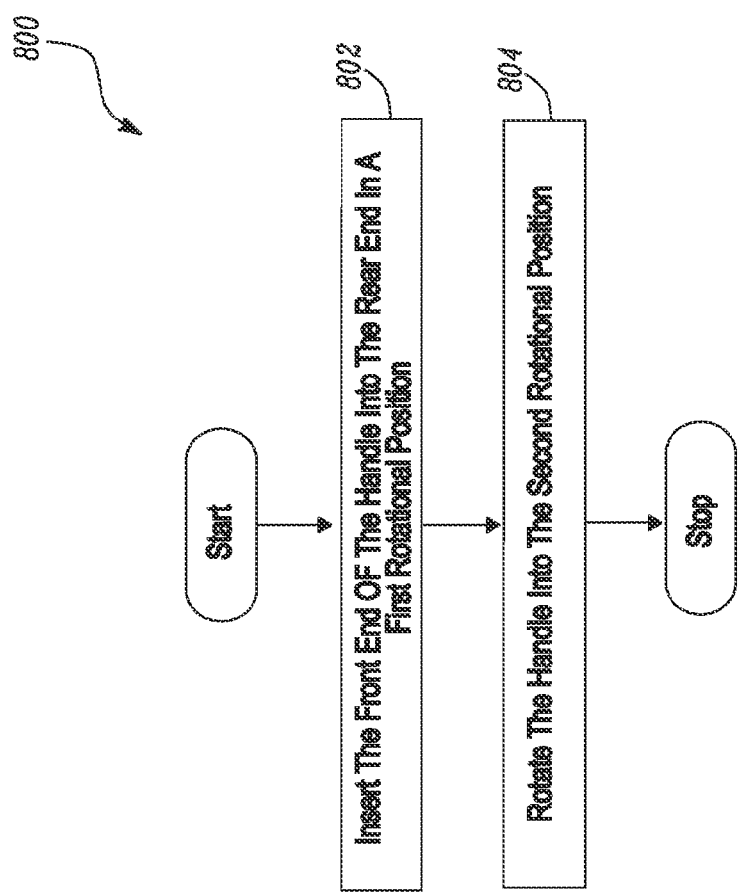
FIG. 8 is a flowchart illustrating a method for mounting the handle on the power driven hand tool, according to an embodiment of the present invention.

FIG. 8 is a flowchart illustrating a method 800 for mounting and securing the handle 110 on the power driven hand tool 100, according to an embodiment of the present invention. As explained in previous figures, the connecting part 112 may be provided for connecting the handle 110 with the main body 104 of the power driven hand tool 100. In an embodiment of the present invention, the front end of the handle 110 may have a tubular shape and a protrusion 202, extending in a substantially radial direction. Further, the connecting part 112 may have a tubular shape at the inner side of its rear end, where it is connected to the handle 110, and the recess 206 corresponding to the protrusion 202 on the handle 110. The recess 206 may extend in a substantially axial direction of the tube shaped part of the connecting part 112. The recess 206 and the protrusion 202 are arranged in such a way that the protrusion 202 may slide in the recess 206 at insertion of the handle 110 into the connecting part 112.

In step 802, the front end of the handle 110 is inserted into the rear end of the connecting part 112, in a first rotational position in relation to the connecting part 112 (and to the power driven hand tool 100). The first rotational position is a position, in which the protrusion 202 can enter the recess 206 and the tube shaped part of the handle 110 can be inserted into the connecting part 112. In a preferred embodiment of the present invention, the first rotational position is a non-operational position 704 of the handle 110, i.e. a position which is not intended for operation of the power driven hand tool 100. Further, there may be a plurality of non-operating positions suitable for insertion of the handle 110 into the connecting part 112. The protrusion 202 and the recess 206 are adapted to restrict the rotational position of the handle 110 at insertion into the connecting part 112, to a non-operating position 704. In an embodiment of the present invention, the first, non-operating, rotational position may be substantially an upside-down position of the handle 110 with respect to the central position.

Further, in step 804 the handle 110 may be rotated into the second rotational position in relation to the connecting part 112 (and to the power driven hand tool 100). The second rotational position is the position, in which the handle 110 is locked to the connecting part 112 by means of an automatic locking mechanism. In a preferred embodiment of the present invention, the automatic locking mechanism is a snap locking mechanism 208. Further, the second rotational position of the handle 110 is located at one end of a continuous angular range of positions 708. The continuous angular range of positions 708 include one or more operating positions. In an embodiment of the present invention, the one or more operating positions 710, 712, 714, 716 and 718 may include the central position.

In an embodiment of the present invention, the snap locking mechanism 208 is arranged in such a way that the handle 110 can be rotated inside the connecting part 112, such that the protrusion 202 on the handle 110 passes the snap locking mechanism 208 and reaches the continuous angular range of positions 708, from the initial non-operating position.

Though the above mentioned invention explains the working with respect to a hedge trimmer, a person skilled in the art may know that such a system may be easily implemented on other tools like, but not limited to, chainsaws.

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:

1. A power driven hand tool comprising:
   a working member;
   a main body comprising a housing with a drive unit configured to drive the working member;
   a handle assembly comprising:
      a handle comprising a protruding ring and a protrusion, the protrusion extending outwards in a substantially radial direction from the protruding ring;
      a connecting part configured to connect the handle to the main body, the connecting part comprising:
         a recess, wherein the recess is disposed in and extends around a portion of the connecting part and is configured to receive the protrusion of the handle when the handle is in a first rotational position, and wherein in the first rotational position, the handle is not configured to enable operation of the power driven hand tool;
         a snap fastener configured to indicate that the protrusion of the handle has been inserted far enough into the recess to be rotated within the recess; and
         a snap locking mechanism configured to secure the protrusion within the recess upon the handle being rotated to a second rotational position thereby connecting the handle within the connecting part, wherein when the handle is in the second rotational position, the handle is configured to enable operation of the power driven hand tool,
         wherein the second rotational position is located approximately 90 degrees from the first rotational position, and
         wherein the handle is configured to be detachable from the connecting part.

2. The power driven hand tool of claim 1, wherein the recess extends in a substantially axial direction around the portion of the connecting part.

3. The power driven hand tool of claim 1, wherein the snap fastener is located approximately 180° from the recess.

4. The power driven hand tool of claim 1, wherein the snap locking mechanism is located approximately 90° from the recess.

5. The power driven hand tool of claim 4, wherein in response to the protrusion being secured within the recess by the snap locking mechanism, the handle reaches a predefined continuous angular range of positions in which the handle is configured to enable operation of the power driven hand tool.

6. The power driven hand tool of claim 5, wherein each position of the predefined continuous angular range of positions is located from approximately 90 to 180° from the first rotational position.

7. The power driven hand tool of claim 1, wherein the connecting part is fixedly mounted on the main body.

8. The power driven hand tool of claim 1, wherein the automatic snap locking mechanism comprises a locking tab.

9. The power driven hand tool of claim 1, wherein in the first rotational position, the handle is in a substantially upside-down position.

10. A handle assembly for user operation of a power driven hand tool, the handle assembly comprising:
    a handle comprising a protruding ring and a protrusion, the protrusion extending outwards in a substantially radial direction from the protruding ring; and
    a connecting part configured to connect the handle to a main body of the power driven hand tool, the connecting part comprising:
       a recess, wherein the recess is disposed in and extends around a portion of the connecting part and is configured to receive the protrusion of the handle when the handle is in a first rotational position, and wherein in the first rotational position, the handle is not configured to enable operation of the power driven hand tool;
       a snap locking mechanism configured to secure the protrusion within the recess upon the handle being rotated to a second rotational position thereby connecting the handle within the connecting part, wherein when the handle is in the second rotational position, the handle is configured to enable operation of the power driven hand tool, wherein the second rotational position is located approximately 90 degrees from the first rotational position, and wherein the handle is configured to be detachable from the connecting part.

11. The handle assembly of claim 10, wherein the recess extends in a substantially axial direction around the portion of the connecting part.

12. The handle assembly of claim 10, wherein the snap fastener is located approximately 180° from the recess.

13. The handle assembly of claim 10, wherein the snap locking mechanism is located approximately 90° from the recess.

14. The handle assembly of claim 13, wherein in response to the protrusion being secured within the recess by the snap locking mechanism, the handle reaches a predefined continuous angular range of positions in which the handle is configured to enable operation of the power driven hand tool.

15. The handle assembly of claim 14, wherein each position of the predefined continuous angular range of positions is located from approximately 90 to 180° from the first rotational position.

16. The handle assembly of claim 10, wherein the connecting part is fixedly mounted on the main body.

17. The handle assembly of claim 10, wherein the automatic snap locking mechanism comprises a locking tab.

18. The handle assembly of claim 10, wherein in the first rotational position, the handle is in a substantially upside-down position.

* * * * *